United States Patent [19]

Mills et al.

[11] Patent Number: 5,991,874
[45] Date of Patent: *Nov. 23, 1999

[54] CONDITIONAL MOVE USING A COMPARE INSTRUCTION GENERATING A CONDITION FIELD

[75] Inventors: Jack D. Mills, San Jose; Donald Alpert, Santa Clara, both of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/660,094

[22] Filed: Jun. 6, 1996

[51] Int. Cl.⁶ .................................. G06F 7/00; G06F 7/38
[52] U.S. Cl. ........................... 712/300; 712/200; 712/210; 712/236; 712/245
[58] Field of Search ...................................... 395/375, 386, 395/581, 583, 586–587, 595, 895, 869; 364/736, 736.5; 345/376, 386, 581, 583, 586–587, 545; 712/200, 208–210, 234, 236, 240, 245, 247–248, 300

[56] References Cited

U.S. PATENT DOCUMENTS

| | | | |
|---|---|---|---|
| 4,949,238 | 8/1990 | Kamiya | 711/164 |
| 5,125,092 | 6/1992 | Prener | 395/706 |
| 5,210,833 | 5/1993 | Kaneko | 712/236 |
| 5,237,666 | 8/1993 | Suzuki et al. | 712/240 |
| 5,519,649 | 5/1996 | Takahashi | 708/525 |
| 5,619,715 | 4/1997 | Dinkjian et al. | 712/300 |
| 5,634,119 | 5/1997 | Emma et al. | 712/240 |
| 5,717,952 | 2/1998 | Christiansen et al. | 710/22 |
| 5,761,470 | 6/1998 | Yoshida | 712/210 |

*Primary Examiner*—Zarni Maung
*Assistant Examiner*—Bharat Barot
*Attorney, Agent, or Firm*—Blakely, Sokoloff, Taylor & Zafman LLP

[57] ABSTRACT

An apparatus for use in a computer system comprises a first storage area and a circuit, coupled to the first storage area, configured to perform a comparison of a data element A with a data element B. In response to a single instruction, the circuit performs the comparison and outputs a condition field of at least one bits when the comparison of A and B is TRUE, or else the circuit outputs the ones-complement of the condition field when the comparison of A and B is FALSE. The circuit may be used in conjunction with a sequence of instructions to select bits from a first data element and bits from a second data element using the one or more condition field bits.

20 Claims, 2 Drawing Sheets

CONDITIONAL MOVE USING A COMPARE INSTRUCTION GENERATING A CONDITION FIELD

BACKGROUND

1. Field of the Invention

The invention relates to the field of microprocessors, and more particularly to instructions for evaluating conditions and moving data.

2. Art Background

Computer programs are comprised of multiple instructions which are decoded and executed by the microprocessor. When the program is "run", the microprocessor begins executing the instructions in the program in the sequence in which they appear. Not all of the instructions in the program are typically executed when the program is run. Rather, some instructions are conditional, that is, whether or not they are executed depends upon the outcome of a previous instruction in the program. That is, the microprocessor may skip the execution of some instructions if certain conditions are not met while the program is running.

Table 1a shows both a set of high-level instructions and a set of assembly-level instructions for implementing a conditional statement that moves data to a destination location inside a computer system. The instructions on the left side of the table are from a high-level programming language, in this example C language. The instructions are stored in a machine readable medium, such as computer memory. A high-level language compiler, such as a C language compiler, is used to compile the high-level instructions into assembly instructions compatible with the particular computer system on which the instructions are targeted to execute. After compilation, each high-level instruction typically corresponds to one or more assembly-level instructions, although it is possible for one assembly instruction to correspond to multiple high-level instructions. This process is well known in the art of microprocessors. In Table 1a, letters represent program variables which may be kept in registers within the microprocessor or in memory.

TABLE 1a

| High-Level Instructions | Assembly-Level Instructions |
|---|---|
| IF (Y>5) | 100 CMP R1=(Y>5) |
| A=2 | 110 CJMP FALSE R1, J1 |
| ELSE | 120 MOV A, 2 |
| A=9 | 130 JMP J2 |
|  | 140 J1: MOV A, 9 |
|  | 150 J2: |

As shown by the assembly-level instructions in Table 1a, a compare instruction 100 is executed to determine if the condition y>5 is TRUE. Following the compare instruction, a conditional jump instruction 110 is executed. If the condition y>5 evaluates to a value of logical TRUE, the conditional jump instruction 110 does not cause a jump, and a MOV instruction 120 is executed. The MOV instruction 120 moves the value 2 to the variable A. Upon completion of MOV instruction 120, a jump instruction 130 is executed to jump over a MOV instruction 140 to an address 150. If the condition Y>5 does not evaluate to logical TRUE, the conditional jump instruction 110 causes a jump to the MOV instruction 140. The MOV instruction 140 moves the value 9 to the variable A. Note that the implementation of what defines "TRUE" in a computer system will vary among computer systems, but typically involves the setting of a one or more bits in a register.

TABLE 1b

| High-Level Instructions | Assembly-Level Instructions |
|---|---|
| IF (Y>5) | 155 CMP R1=(Y>5) |
| A=2 | 156 CMOV R1, A=2 |
| ELSE | 157 CMOV !R1, A=9 |
| A=9 |  |

Table 1B shows both a set of high-level instructions and a set of assembly-level instructions for implementing a conditional move in a computer system. In Table 1b, as in Table 1a, letters represent program variables which may be kept in registers within the microprocessor or in memory. As shown by the assembly-level instructions in Table 1b, a compare instruction 155 is executed to determine if the condition y>5 is TRUE. Following the compare instruction, a conditional move instruction 156 is executed. If the condition y>5 evaluates to a value of logical TRUE, the conditional move instruction 156 causes the value 2 to be moved to the variable A. Upon completion of conditional move instruction 156, a conditional move instruction 157 is executed. Conditional move instruction 157 evaluates the complement of the value in register R1. If the condition Y>5 does not evaluate to logical TRUE, the conditional move instruction 157 causes the value 9 to be moved to the variable A.

In a pipelined computer, multiple functional units simultaneously execute multiple instructions from a computer program, leading to substantial performance increases. Each instruction in a typical pipelined computer goes through four stages: fetch, decode, execute, and writeback. In the fetch stage, the processor fetches an instruction from an instruction memory, which can be a cache memory, main RAM, flash memory, or other type of machine-readable medium. During the decode stage, the instruction is partially or fully decoded to determine the type of execution unit required to complete the instruction, and the instruction's operands are read from registers. During the execution stage, simple integer arithmetic and logic operations generally complete in one clock cycle on many pipelined processors. During the writeback stage the results of the instruction's execution are written back to registers or are written to other places in computer memory, such as cache memory or main RAM.

A pipelined computer operates most efficiently when the instructions are executed in the sequence in which they appear in memory. Unfortunately, conditional statements and the branch instructions they produce constitute a large portion of the executed instructions in a computer program. When a branch instruction is executed, execution continues either with the next sequential instruction, or with an instruction at a specified "target" address. A branch instruction is said to be "Taken" if execution continues at the target address, or "Not Taken" if execution continues with the next sequential instruction in memory. For example, in Table 1a the target of the branch instruction 130 is the address J2 150.

A branch instruction is either unconditional, meaning the branch is taken every time the instruction is executed, or conditional, meaning the branch is taken or not depending upon a condition. The instructions to execute following a conditional branch are not known with certainty until the condition upon which the branch depends is resolved. Prefetching and executing the instructions at the target address of the branch can lead to a significant performance hit when the branch is "Not Taken". Branches may also be forward, meaning the target address is greater than the address of the branch, or backward, meaning the target address is less than the address of the branch.

Conditional branch instructions such as the instruction 110 in Table 1a typically use a condition field. The value of this field is typically set by the compare instruction and indicates whether the condition evaluated by the compare instruction evaluated to TRUE or FALSE. Subsequent instructions examine the field to determine whether the condition evaluated TRUE or FALSE. For example, a subsequent jump instruction (e.g. CJMP instruction 110 in Table 1a) might examine the condition field and perform a jump only if the bits of the condition field are set. Otherwise, program execution continues with the next instruction after the jump instruction in the execution sequence (e.g. MOV instruction 120 in Table 1a). Note that the computer architecture may be defined to store the condition field in either a general purpose register or in a special purpose register such as a status register or flags register. The architecture may also be defined to incorporate the function of the compare instruction and the branch instruction into a single compare-and-branch instruction which does not make reference to any condition field. The present invention applies equally well to these alternative embodiments.

As stated above, branch instructions may cause a non-sequential change in the fetching of instructions, i.e. the next instruction to be executed may not sequentially follow the previously executed instruction. The direction of a branch instruction is not known until the branch is executed which typically occurs in the execute stage in a pipelined processor. While waiting for the branch instruction to reach the execute stage the intervening stages between the fetch stage and the execute stage are filled based upon a prediction as to the direction of the branch instruction. When branch direction is not correctly predicted, any fetched and partially executed instructions resulting from the incorrect prediction must be flushed from the pipeline. Even an incorrect prediction rate of 5 percent results in a substantial loss in performance due to the number of instructions incorrectly fetched/partially executed in reliance on the wrong prediction. Further delays are incurred while the processor fetches the correct instructions to execute following the branch. It is therefor highly desirable in pipelined computers to eliminate as many branch instructions as possible from the instructions of a computer program.

Another phenomenon which can degrade the performance of pipelined computers is data dependencies. A data dependency exists between two instructions if the execution of one depends upon the results of executing the other. Each instruction has the potential to stall later instructions that depend on it. The following table shows how data dependencies can cause pipeline stalls.

TABLE 1c

160 ADD r1, r2, r3
161 LOAD [r3], r6
162 AND r5,r8,r7
163 ADD r6,r7,r1
164 SUB r3,r4,r5

The instructions in Table 1c have an opcode, followed by two or three registers. Instructions that use three registers have two source registers followed by a destination register. An instruction using two registers has a source register followed by a destination register. When a register is enclosed in brackets, then the register is used to address memory. For example, the instruction LOAD [r3], r6 161 loads register r6 with the contents of the memory address in register r3.

In Table 1c, the ADD instruction 163 has a dependency on the preceding LOAD instruction 161. The dependency is on the contents of register r6, which the LOAD instruction 161 fills with the contents of the memory address specified in r3. In this example, the LOAD instruction 161 has not completed execution by the time the ADD instruction 163 is ready to execute, because the LOAD instruction 161 takes, for example, four clock cycles to complete. The ADD instruction 163 is ready to execute only two clock cycles after the LOAD instruction 161 begins execution. The ADD instruction 163 will stall execution in the pipeline for two clock cycles, until the LOAD instruction 161 updates the contents of register r6 so that the ADD instruction 163 can add the contents of register r6 with the contents of register r7. Note that the SUB instruction 164 following the ADD instruction 163 does not depend on the completion of the LOAD instruction 161, nor on the completion of the ADD instruction 163. Therefor, the SUB instruction 164 can be executed while waiting for the LOAD instruction 161 to complete.

Out-of-order (OOO) execution can be used to lessen or eliminate the effect of stalls due to instruction dependencies. Upon encountering an instruction that depends on an instruction still in execution, the OOO execution processor checks for later independent instructions in the program and executes these later instructions before the dependent instruction (such as in the case of the SUB instruction 164 in Table 1c). This reduces the impact of execution stalls because the execution of later independent instructions is overlapped with the execution of instructions requiring multiple clocks to complete.

There are three types of data dependencies which can occur in computer programs: read-after-write (RAW) dependencies, write-after-write (WAW) dependencies, and write-after-read (WAR) dependencies. RAW dependencies occur when an instruction requires the result of a previous instruction. WAW dependencies occur when two instructions write the same register and therefore the writes must occur in the order specified by the program to guarantee subsequent instructions receive the correct value. WAR dependencies occur when an instruction writes the same register that was read by a previous instruction, and therefore the write must occur after the read to guarantee that the correct value is read. Table 1d illustrates the three types of data dependencies.

TABLE 1d

180 ADD r1, r2, r3
190 SUB r3, r4, r5
192 SHR r6, r7, r4
194 OR r8, r9, r3

In Table 1d, the ADD instruction 180 writes R3 with the sum of the values in R1 and R2. Register R3 is subsequently read by the SUB instruction 190. A RAW dependency exists that prevents the SUB instruction 190 from being executed prior to the ADD instruction 180. The SUB instruction 190 reads register R4 which is subsequently written by the SHR instruction 192. A WAR dependency exists that prevents the SHR instruction 192 from being executed prior to the SUB instruction 190 even though the SHR instruction 192 does not use the result of the SUB instruction 190. Finally, the ADD instruction 180 writes register R3 which is subsequently written by the OR instruction 194. A WAW dependency exists that prevents the OR instruction 194 from being executed prior to the ADD instruction 180, even though the OR instruction 194 does not use the result of the ADD instruction 180.

Due to the limited numbers of registers in a processor, the same register will typically be written by multiple instructions during execution of a single program. In Table 1d above, because the OR instruction 194 writes register R3, a WAW dependency is created with the ADD instruction 180. If the OR instruction 194 uses a register other than R3 as a destination, for example register R10, then the WAW dependency is eliminated. The same reasoning applies to the SHR instruction 192; if the SHR instruction 192 uses a register other than R4 as a destination, then the WAR dependency with the SUB instruction 192 is eliminated. Thus WAR and WAW dependencies are "artificial" dependencies created by multiple instructions using the same register as a destination. Although impractical, WAR and WAW dependencies could be completely eliminated by constructing a program such that the same register is never written more than once.

A technique known as "register renaming", known in the prior art, can be used to eliminated WAR and WAW dependencies. Register renaming operates by changing the name of the destination register of all instructions from the name assigned by the high level language compiler (typically referred to as virtual registers) to a unique name in another namespace (typically referred to as physical registers). Table 1e depicts the instructions from Table 1d both before and after register renaming.

TABLE 1e

| Before Renaming | After Renaming |
|---|---|
| ADD r1, r2, r3 | ADD r1, r2, rA |
| SUB r3, r4, r5 | SUB rA, r4, rB |
| SHR r6, r7, r4 | SHR r6, r7, rC |
| OR r8, r9, r3 | OR r8, r9, rD |

The virtual register destination of each instruction is renamed to a unique (typically sequential) physical register name (for example rA, rB, etc.) and this new physical name is provided to all subsequent instructions which read the corresponding virtual register. Register renaming is commonly employed in OOO execution processors to eliminate WAR and WAW dependencies and therefore increase the number of independent instructions. Renaming is performed early in the pipeline, prior to execution, so that the instruction issue and execution logic do not see any WAR or WAW dependencies.

In the prior art conditional move (see Table 1b), the destination of the move instruction is conditionally modified, that is, if the condition evaluates to TRUE then the destination is modified, otherwise the destination is not modified. This conditional modification of the destination causes complications in the implementation of register renaming. At the time when register renaming is performed, the result of evaluating the condition is not known, in general, and therefore it is not known whether the destination register of the conditional move will be modified (and should therefore be renamed). Table 1f depicts two versions of an example code sequence, one in which the destination register of the conditional move is renamed and one in which it is not. It will be apparent to those skilled in the art that, in both situations, the name of the source register of the SUB instruction is ambiguous until the condition is resolved. The SUB instruction should read rA if the CMOVE instruction does not perform a move, or the destination of the CMOVE instruction if it does perform a move. Because of this ambiguity, register renaming is made more complex by the prior art conditional move.

TABLE 1f

| Original Code | CMOVE Renamed | CMOVE Not Renamed |
|---|---|---|
| ADD r1, r2, r3 | ADD r1, r2, rA | ADD r1, r2, rA |
| CMOVE r4, r5, r3 | CMOVE r4, r5, rB | CMOVE r4, r5, r3 |
| SUB r3, r6, r7 | SUB r?, r6, rC | SUB r?, r6, rC |

It is apparent from the preceding discussion that existing schemes for conditionally moving data in a computer system have several disadvantages. In particular, it would be advantageous to conditionally move data in a computer system without the use of conditional branch instruction. It would also be advantageous to conditionally move data without incurring the ambiguities and complexities of the prior art implementations when register renaming and out-of-order execution are involved.

SUMMARY OF THE INVENTION

An apparatus for use in a computer system comprises a first storage area capable of storing a data element A and a data element B, and an execution unit, coupled to the first storage area, configured to perform a comparison of a data element A with a data element B, the execution unit to output a condition field of at least one bit when the comparison of A and B is TRUE, the circuit to output a ones-complement of the condition field when the comparison of A and B is FALSE. The comparison and output of the condition field result from execution of a single instruction.

DETAILED DESCRIPTION

Figure 1:
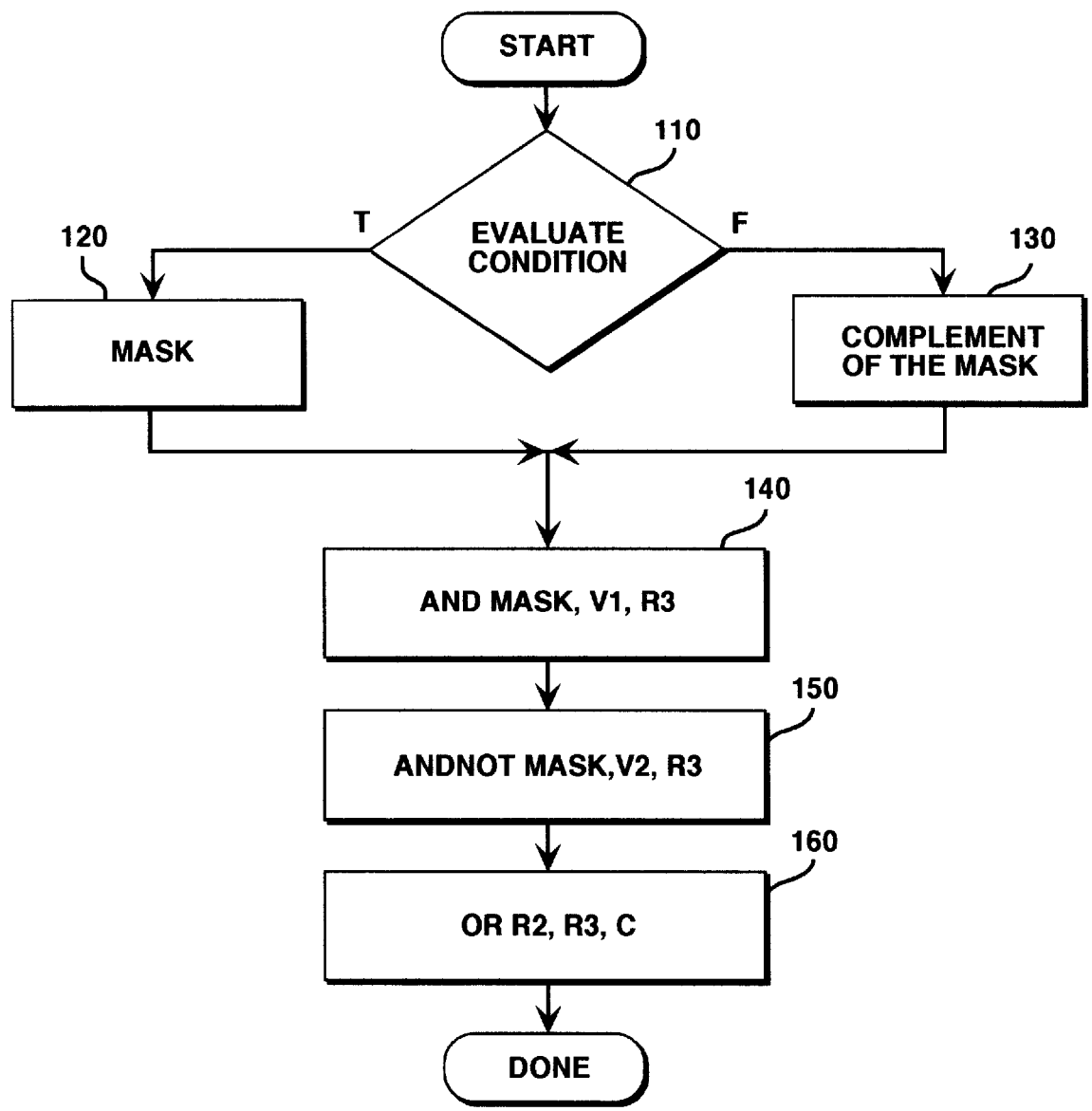
FIG. 1. illustrates the steps of performing a conditional move without the use of branch instructions, using the compare instruction generating a condition field.

In the following descriptions, numerous specific details are set forth such as circuits, flow diagrams, etc, in order to provide a thorough understanding of the invention. In other instances, well-known structures and techniques have not been shown in detail because to do so would unnecessarily obscure the invention.

The invention is a compare instruction evaluating a condition and generating a condition field, and a method for using this condition field to implement a conditional move. Selected bit positions of the condition field are set based upon the outcome of the evaluation. These bit positions correspond to the bit positions in a first data element to move to a destination location if the condition is TRUE, while bit positions of the condition field which are not set correspond to bit positions of a second data element to move to the destination. In the preferred embodiment, the condition field has a number of bits equal to the number of bits in the data elements being operated upon. To perform the conditional move, the condition field is bitwise ANDed with the first data element. The complement of the condition field is bitwise ANDed with the second data element. When the condition is TRUE, bits from the first data element in positions corresponding to the set bit positions of the condition field are moved to the destination, along with bits of the second data element corresponding to bit positions in the condition field which are not set. As a result, the destination may be comprised of a co-mingling of bits from the first and second data elements. Since the destination of the move is unconditionally modified regardless of the outcome of evaluating the condition, no branches are required and complications with register renaming are avoided.

Alternate embodiments are possible, for example, the condition field could be bitwise ANDed with the second data element and the complement of the condition field could be bitwise ANDed with the first data element. In other embodiments the condition field may have a number of bits less than the width of the data elements, for example the condition field may be a single bit.

The conditional move using the invention operates on the following Boolean formula:

DEST=COND & SRC1+!COND & SRC2, where "DEST" is the destination; "COND" is the condition field generated by the compare instruction in the invention; "SRC1" is a first data element; and "SRC2" is a second data element. The symbol "!" represents the logical bitwise complement operation; "+" represents the logical bitwise OR operation; and "&" represents the logical bitwise AND operation. Note that DEST is written independently of the outcome of evaluating the condition, with bits from both the first and second data elements (SRC1 and SRC2), and so no conditional branch instructions are required.

COND is the result of executing the compare instruction generating a condition field. In one embodiment, when the condition is TRUE, the compare instruction writes ones in the condition field corresponding to the bit positions to move in the first data element; other bit positions are written with zeros. When the condition is FALSE, then the compare instruction writes zeroes in the bit positions of the condition field corresponding to the bit positions of the first data element to move; other bit positions are written with ones. By defining the compare instruction in this manner, a conditional move can be implemented with traditional logical AND and OR instructions, with no additional instructions over those found in prior art instruction sets. This functionality is useful for implementing the "if-then-else" construct found in many high level languages. When the condition is TRUE, bits from the first data element corresponding to bits set to ones in the condition field are moved to the destination, along with bits from the second data element corresponding to bit positions in the mask which are set to ones.

Note that alternate embodiments are possible, for example the condition field may be less than the width of the data elements to operate on. Another alternate embodiment writes zeroes in the predetermined bit positions when the condition evaluated by the compare instruction is TRUE, and ones when the condition is FALSE.

FIG. 1 illustrates the steps of performing the conditional move without the use of branch instructions. While this method can be used to implement an if-then-else logical statement, alternate embodiments may use the sequence of instructions or their equivalents to implement an if-then logical statement. The condition is evaluated at step 110. If the condition is TRUE then a condition field is generated at step 120. As an example, the condition field can have the value "00000101". If the condition is FALSE, the complement of the condition field generated in step 120 is generated at step 130. In the present example, the complement of the condition field is "11111010". Of course, the specific value of the condition field is a design choice, and the particular value shown here is merely exemplary. Other embodiments may implement one or more different condition field values without departing from the scope of the invention.

After generating the condition field based upon the outcome of evaluating the condition, the next step is ANDing the condition field at step 140 with the first data element to move, and placing the result in register R2. In the present example, if the condition was TRUE, bits 0 and 2 from data element V1 are copied to register R2. However, if the condition was FALSE, bits 7,6,5,4,3 and 1 of data element V1 are copied to register R2. After ANDing the condition field with the first data element to move, the next step is ANDing the complement of the condition field (i.e. AND-NOTing the condition field) with the second data element V2 at step 150. This step complements the data element of the condition field and ANDs this complemented condition field with the second data element V2. The result of step 150 is stored in the third register R3. In the present example, the result in R3 will be bits 7,6,5,4,3 and 1 of the second data element V2 if the condition was TRUE. However, if the condition was FALSE, bits 2 and 0 of data element V2 are copied to R3. After ANDing the complement of the condition field with the second data element V2, the next step 160 is ORing the results of the AND operation 140 and the ANDNOT operation 150. In the present example, when the condition is TRUE, the result in variable C contains bits 2 and 0 from V1 and bits 7,6,5,4,3, and 1 from V2. When the condition is FALSE, the result in variable C contains bits 2 and 0 from V2 and bits 7,6,5,4,3, and 1 from V1. It is apparent from FIG. 1 that the AND step 140 and the ANDNOT step 150 may be performed in parallel to improve the performance of the conditional move. No dependencies exist between the two steps, and so parallel execution is enabled in superscalar and multi-processor systems.

Other variations of the method of FIG. 1 are possible, for example the step 160 of ORing may be replaced by a step of logically ADDing the results of steps 140 and 150. Examples of other embodiments are: a combination of a logical NOT and OR steps can produce the same results as an AND step (e.g. X AND Y=NOT ((NOT X) OR (NOT Y))); a combination of a logical NOT and AND steps can produce the same results as an OR step (e.g. X OR Y=NOT ((NOT X) AND (NOT Y))); and the ANDNOT step can be replaced with a combination of other steps (e.g. X ANDNOT Y=X AND (NOT Y)); Finally, it should be apparent that countless other equivalencies can be substituted for any individual step or combination of steps.

In one embodiment, the comparison step 110, the AND step 140, the ANDNOT step 150, and the OR step 160, are each configured to operate upon only a subset of the bits in their source operands. For example, each step may act upon the first bit of its source operand. At step 110 the condition is evaluated and a condition field is generated in which the first bit (bit position 0) is set to one when the condition is TRUE, and set to zero otherwise. The AND step 140 ANDs the first bit of the condition field with the first bit of the first data element V1. The remaining bits of the source operand and condition field are not operated upon. The ANDNOT step 150 performs similarly with the complement of the first bit of the condition field. The OR step 160 ORs the first bits of each of the results of steps 140 and 150. As a result, only the first bit of either the first data element V1 or the alternate data element V2 is moved to the destination.

TABLE 2

Assembly-Level Instructions

CMP< Y,5,R1
AND R1,A,R2
ANDNOT R1,C,R3
OR R2,R3,C

As previously stated, the sequence of steps shown in FIG. 1 can also be used to perform a logical if-then statement. The if-then statement is implemented by replacing the second data element V2 in step 150 with the destination data element C. Table 2 shows the assembly-level instructions which implement a logical if-then statement using the method of FIG. 1. In Table 2, the operands of the instructions have been selected so that if the condition is FALSE, the bits of desitination C corresponding to the second data element are copied back onto themselves in the event that the condition evaluates to FALSE. In other words, the bits of destination C corresponding to the second data element are left unchanged if the condition of the "if" statement is not satisfied (if Y is not less than 5).

In the preferred embodiment, the compare instruction, the AND instruction, the ANDNOT instruction, and the OR instruction, are each configured to operate upon all of the bits in their source operands. In another embodiment, the compare instruction, the AND instruction, the ANDNOT instruction, and the OR instruction, are each configured to operate upon only a subset of the bits in their source operands, for example, upon the first bit of their source operands.

It is possible to define bits to conditionally move which are not part of predetermined fields within the source data elements. For example, if the source data elements comprised 64 bits divided into 8 fields of 8 bits each, the conditional move can operate on bits within a particular field, across field boundaries, or upon individual bits of different fields.

It is apparent from FIG. 1 and Table 2 that the performance of computer programs in a pipelined computer system is improved using the invention, because branch instructions are eliminated in situations where data is moved conditionally. It is also apparent that alternate embodiments may achieve the same result without departing from the scope of the invention. For example, the ANDNOT instruction may be replaced with two instructions. The first instruction complements the condition field, and the second instruction ANDs the complemented condition field with the alternate value to move. Also, the AND instruction and the ANDNOT instruction may be executed in parallel to improve the performance of the conditional move.

Other variations of the conditional move implementation are possible, without departing from the spirit or the scope of the invention. For example, the order of the AND instruction and ANDNOT instruction may be reversed. Also, the condition field and the operands of the instructions may be any bit width, for example 8, 16, 32, or 64 bits wide. Any subset of the bits of the condition field may be set to one, and these bits which are set need not be sequentially positioned within the condition field, nor need they be associated with predetermined fields within the data elements. Also, because the conditional move operation is performed at the bit level, the data format of the values operated on by the instructions may be any format, including integer, long integer, packed, and floating point formats.

Figure 2:
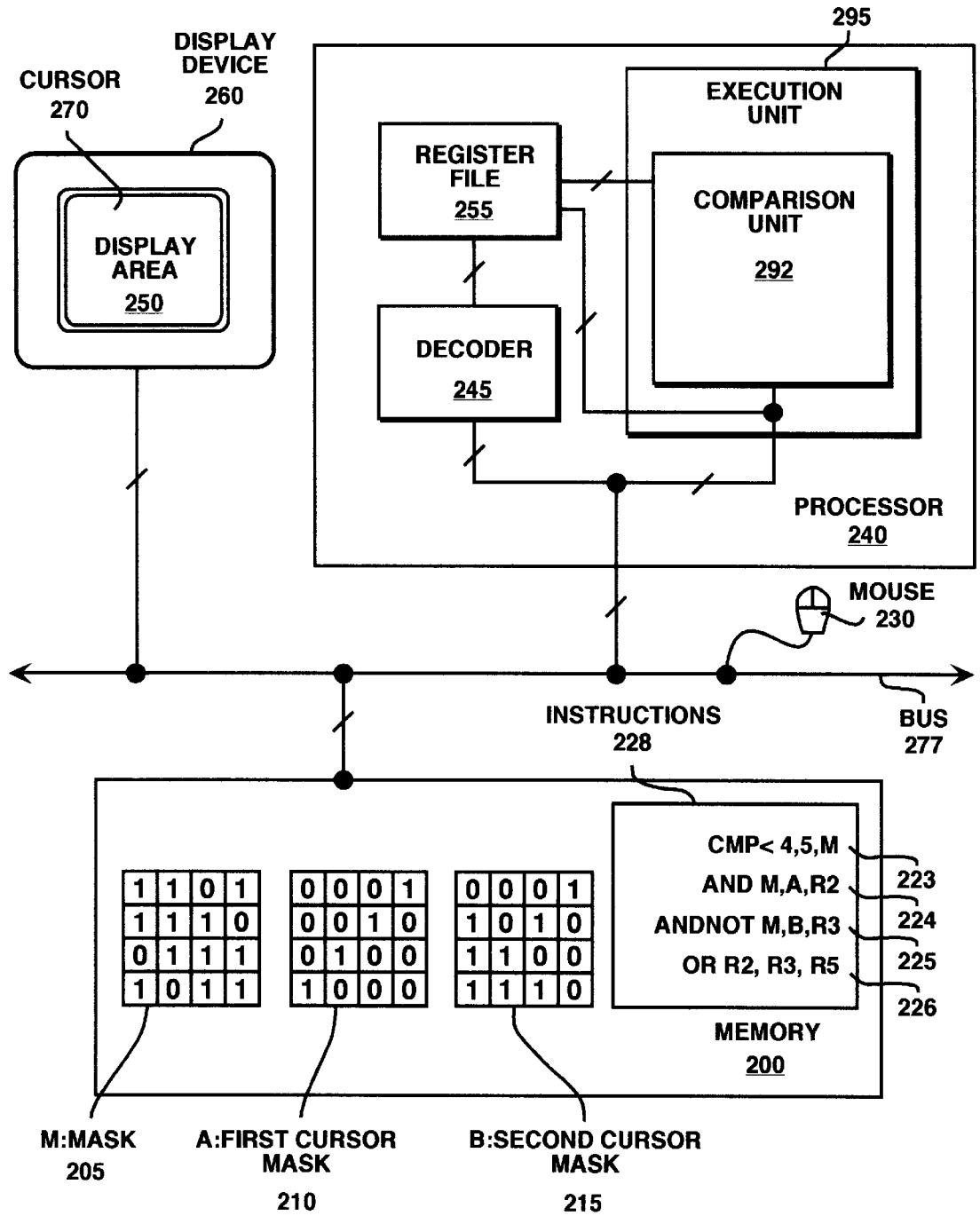
FIG. 2. shows a computer system implementing the method of FIG. 1.

FIG. 2 illustrates a computer system using the compare instruction generating a condition field to select either a first or a second display cursor. In FIG. 2, the compare instruction generating a condition field is used to select one of two cursors, each with a different shape. A memory 200 stores a first cursor mask 210 at memory location A, and a second cursor mask 215 at location B. The memory 200 also stores instructions 228 for carrying out the conditional move method of FIG. 1. Instruction 223 is the compare instruction generating a condition field 205. The condition field 205 is output by the compare instruction 223 to location M in memory 200. Thus, the memory 200 contains the first cursor mask 210, the second cursor mask 215, the instructions 228, and the condition field 205 output by the compare instruction 223. The specific values of the condition field 205, the first cursor mask 210, and the second cursor mask 215 shown in FIG. 2 are merely exemplary, and the invention is in no way limited to the use of the particular values shown.

The memory 200 is coupled to a processor 240 by way of a bus 277. Using the bus, the processor 240 accesses the various elements stored in the memory 200. The processor 240 contains a decoder 245 for decoding the instructions 228, a register file 255 for storing the operands and results of the instructions 228, and an execution unit 295 for executing the instructions 228. Of course, the processor 240 contains additional circuitry which is not necessary to understanding the invention. The decoder 245 is coupled to the bus 277, and the register file 255 is coupled to the decoder 245. The operands of instructions decoded by the decoder 245 are made available to the execution unit 295 by placing them in the register file 255. The decoder may be implemented using hard-wired circuitry, a Programmable-Gate-Array, a microcoded ROM, or by any other method known in the art.

The execution unit 295 is coupled to decoder 245 and register file 255. In addition, the execution unit 295 contains a comparison unit 292 for implementing the compare instruction generating a condition field. The comparison unit 292 may be implemented using any combination of hardware and/or software (e.g. microcode instructions). The comparison unit 292 outputs a condition field 205 based upon the result of the comparison. If the condition was TRUE, then the comparison unit 292 outputs a condition field value to its output. Otherwise, the comparison unit 292 outputs the complement of the condition field value to its output. The output of the comparison unit 292 is coupled to the bus 277, and the output condition field value 205 is saved over the bus to location M in memory 200. Note also that the output of the comparison unit 292 is coupled to the register file 255, so that the condition field may be saved into the register file 255 instead of memory 200.

TABLE 4

| Condition field Output by Compare Instruction | First Partial Result: Condition field ANDed with First Cursor Mask | Second Partial Result: Complement of Condition field ANDed with Second Cursor Mask | ORing First and Second Partial Results |
| --- | --- | --- | --- |
| 1 1 0 1 | 0 0 0 1 | 0 0 0 0 | 0 0 0 1 |
| 1 1 1 0 | 0 0 1 0 | 0 0 0 0 | 0 0 1 0 |
| 0 1 1 1 | 0 1 0 0 | 1 0 0 0 | 1 1 0 0 |
| 1 0 1 1 | 1 0 0 0 | 0 1 0 0 | 1 1 0 0 |

Table 4 shows, in column 1, the exemplary value of condition field 205 from FIG. 2. This condition field is ANDed with the first cursor mask 210 to obtain the first partial result in column 2. The complement of the condition field 205 is ANDed with the second cursor mask 215 to obtain the second partial result in column 3. Finally, the first and second partial results are combined using the OR instruction 226, resulting in the final cursor mask shown in column 4. The final cursor mask, when displayed, gives shape to the displayed cursor 270 on the display area 250 of the display device 260. In FIG. 2, the final cursor mask is stored in register R5 by OR instruction 226, and is accessed by the display device 260 over the bus 277.

The display device 260 contains a display area 250 for displaying cursors and other graphical information. The display device is coupled to bus 277 and is accessible to both the memory 200 and processor 240 by way of the bus 277. The resulting displayed cursor 270 has visible pixels corresponding to ones (1s) in the final cursor matrix. The displayed cursor 270 can be manipulated using the pointing device 230, which is also coupled to the bus 277. The display device 260 may be a computer video display, a printer, a plotter, or any other device capable of displaying digital information.

TABLE 5

| Condition field Output by Compare Instruction | First Partial Result: Condition field ANDed with First Cursor Mask | Second Partial Result: Complement of Condition field ANDed with Second Cursor Mask | ORing First and Second Partial Results |
|---|---|---|---|
| 0 0 1 0 | 0 0 0 0 | 0 0 0 1 | 0 0 0 1 |
| 0 0 0 1 | 0 0 0 0 | 1 0 1 0 | 1 0 1 0 |
| 1 0 0 0 | 0 0 0 0 | 0 1 0 0 | 0 1 0 0 |
| 0 1 0 0 | 0 0 0 0 | 1 0 1 0 | 1 0 1 0 |

Table 5 shows the cursor condition field which results when the condition is FALSE. The exemplary value of condition field 205 from FIG. 2 is shown in column 1. This condition field is complemented and then ANDed with the first cursor mask 210 to obtain the first partial result in column 2. The (uncomplemented) condition field 205 is ANDed with the second cursor mask 215 to obtain the second partial result in column 3. Finally, the first and second partial results are combined using the OR instruction 226, resulting in the final cursor mask shown in column 4. The final cursor mask in Table 5 which results when the condition is FALSE is clearly different than the final cursor mask in Table 4 which resulted when the condition was TRUE.

Any mechanism for logically performing the processing of instructions 228 is considered to be within the scope of the implementation of the invention, for example, parallel execution of one or more of the instructions. In one embodiment the processor 240 supports an instruction set which is compatible with the Intel® Architecture instruction set used by existing processors, such as the Pentium® processor. Alternative embodiments of the invention may support more or less, as well as different, instructions and still utilize the teachings of the invention.

The memory 200 may be any type of digital storage area, including a Random-Access-Memory (RAM), a cache memory, a Read-Only-Memory (ROM), a flash memory, or any other form of storage area which is capable of storing instructions which are executed by a processor 240. In this example the memory 200 and the processor 240 are shown as separate elements, however, one skilled in the art will readily appreciate that the memory 200 and the processor 240 may be combined into a single integrated device, such as with on-chip cache memories. In addition to storing instructions for execution on the processor, memory 200 may also store data to use with those instructions and temporary variables and other intermediate information resulting from execution of those instructions. One skilled in the art will also appreciate that bus element 277 may be implemented in numerous ways familiar in the art, for example, using an electrically conductive material, or using optical coupling.

The specific arrangements and methods described herein are merely illustrative of the principles of the invention. Numerous modifications in form and detail may be made by those of ordinary skill in the art without departing from the scope of the invention. For example, operands for the CMP, AND, ANDNOT, and OR instructions may be stored in computer memory, as opposed to registers. The compare instruction is shown, for exemplary purposes, as comprising a CMP< (compare less-than) operation. However, the invention is not limited to any particular type of compare operation, and CMP> (compare greater-than), CMP= (compare for equality), CMP≦ (compare less-than-or-equal), and so on may all be employed without departing from the scope or spirit of the invention. Also, the condition field and the intermediate results of the instructions can be stored in computer memory as opposed to being stored in registers.

Although this invention has been shown in relation to a particular embodiment, it should not be considered so limited. Rather, the invention is limited only by the scope of the appended claims.

What is claimed is:

1. A processor comprising:
    a comparison unit to execute a comparison instruction to evaluate a condition and generate a condition field, selected bit positions of the condition field being set based upon an outcome of the evaluation of the condition; and
    at least one execution unit, coupled with the comparison unit, to execute a plurality of logical operator instructions to combine the condition field with a first and second operand to move bits of either the first or second operand corresponding to the selected bit positions of the condition field to a destination, and to move bits of either the second or the first operand, respectively, corresponding to remaining bit positions, if any, of the condition field to the destination, all depending on the evaluation of the condition.

2. The processor of claim 1 wherein the selected bit positions are set to ones and the remaining bit positions, if any, are set to zeros if the evaluation of the condition is TRUE, and the selected bit positions are set to zeros and the remaining bit positions, if any, are set to ones if the evaluation of the condition is FALSE.

3. The processor of claim 1 further comprising:
    a storage area, coupled with said comparison unit, to store a data element A and a data element B, wherein said evaluation of the condition is a comparison of said data element A and said data element B.

4. The processor of claim 1, wherein the at least one execution unit comprises:
    first circuitry to bitwise AND the first operand with the condition field to provide a first partial result;
    second circuitry to bitwise ANDNOT the second operand with the condition field to provide a second partial result; and
    third circuitry to bitwise OR the first partial result and the second partial result and store a final result of the OR in the destination.

5. The processor of claim 3 in which the data element A and the data element B have an integer numerical format.

6. The processor of claim 3 in which the data element A and the data element B have a floating point numerical format.

7. The processor of claim 1 wherein said condition field is greater than one dimensional.

8. A processor comprising:

comparison means for executing a comparison instruction to evaluate a condition and for generating a condition field, selected bit positions of the condition field being set based upon an outcome of the evaluation of the condition; and at least one execution means, coupled with the comparison means, for executing a plurality of logical operator instructions to combine the condition field with a first and second operand to move bits of either the first or second operand corresponding to the selected bit positions of the condition field to a destination, and to move bits of either the second or first operands, respectively, corresponding to remaining bit positions, if any, of the condition field to the destination, all depending on the evaluation of the condition.

9. The processor of claim 8 wherein the selected bit positions are set to ones and the remaining bit positions, if any, are set to zeros if the evaluation of the condition is TRUE, and the selected bit positions are set to zeros and the remaining bit positions, if any, are set to ones if the evaluation of the condition is FALSE.

10. The processor of claim 8 further comprising:

storage means, coupled with said comparison means, for storing a data element A and a data element B, wherein said evaluation of the condition is a comparison of said data element A and said data element B.

11. The processor of claim 8, wherein the at least one execution means comprises:

first circuitry means for bitwise ANDing the first operand with the condition field to provide a first partial result;

second circuitry means for bitwise ANDNOTing the second operand with the condition field to provide a second partial result; and third circuitry means for bitwise ORing the first partial result and the second partial result and storing a final result of the ORing in the destination.

12. The processor of claim 10 in which the data element A and the data element B have a floating point numerical format.

13. The processor of claim 10 in which the data element A and the data element B have an integer numerical format.

14. The processor of claim 8 wherein said condition field is greater than one dimensional.

15. A computer system comprising:

a bus; and a processor coupled to said bus, said processor comprising a comparison unit to execute a comparison instruction to evaluate a condition and generate a condition field, selected bit positions of the condition field being set based upon an outcome of the evaluation of the condition, and at least one execution unit to execute a plurality of logical operator instructions to combine the condition field with a first and second operand to move bits of either the first or second operand corresponding to the selected bit positions of the condition field to a destination, and to move bits of either the second or first operands, respectively, corresponding to remaining bit positions, if any, of the condition field to the destination, all depending on the evaluation of the condition.

16. A method comprising:

executing a comparison instruction to evaluate a condition and generate a condition field wherein selected bit positions of the condition field are set based upon an outcome of the evaluation of the condition; and executing a plurality of logical operator instructions to combine the condition field with a first and second operand to move bits of either the first or second operand corresponding to the selected bit positions of the condition field to a destination, and to move bits of either the second or first operands, respectively, corresponding to remaining bit positions, if any, of the condition field to the destination, all depending on the evaluation of the condition.

17. The method of claim 16 wherein said executing at least two independent instructions comprises:

bitwise ANDing the first operand with the condition field to provide a first partial result;

bitwise ANDNOTing the second operand with the condition field to provide a second partial result;

bitwise ORing the first partial result and the second partial result; and storing a final result of the ORing in the destination.

18. The method of claim 16 wherein the selected bit positions are set to ones and the remaining bit positions, if any, are set to zeros if the evaluation of the condition is TRUE, and the selected bit positions are set to zeros and the remaining bit positions, if any, are set to ones if the evaluation of the condition is FALSE.

19. The method of claim 16 in which the evaluation of the condition is a comparison of a data element A and a data element B, wherein the data element A and the data element B have one of an integer and a floating point numerical format.

20. The method of claim 16 wherein said condition field is greater than one dimensional.

* * * * *

UNITED STATES PATENT AND TRADEMARK OFFICE
CERTIFICATE OF CORRECTION

PATENT NO.   : 5,991,874
DATED        : November 23, 1999
INVENTOR(S)  : Mills et al.

It is certified that error appears in the above-identified patent and that said Letters Patent is hereby corrected as shown below:

<u>Title page,</u>
Item [57], ABSTRACT,
Line 6, delete "one bits", insert -- one bit --.

Signed and Sealed this

Eighth Day of April, 2003

JAMES E. ROGAN
*Director of the United States Patent and Trademark Office*